Dec. 11, 1951      G. A. ARMSTRONG      2,577,992
PHASE ANGLE AND POWER FACTOR METER
Filed Oct. 2, 1950
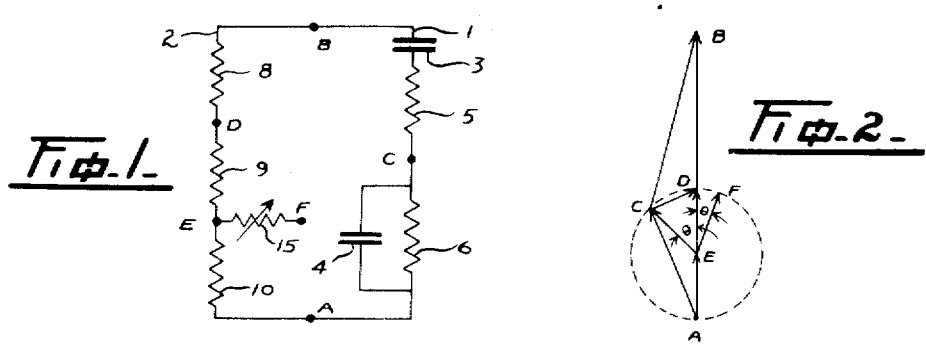
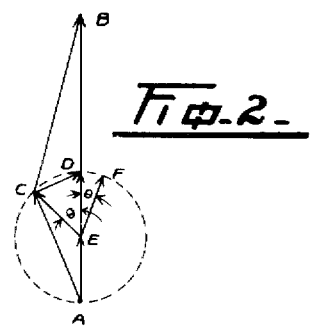
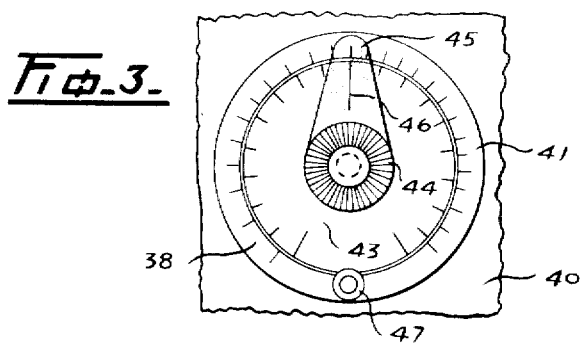
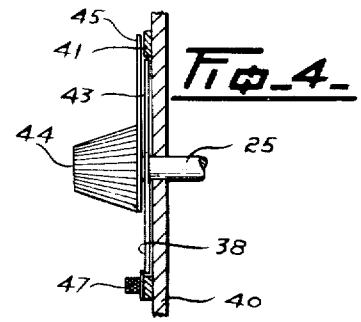
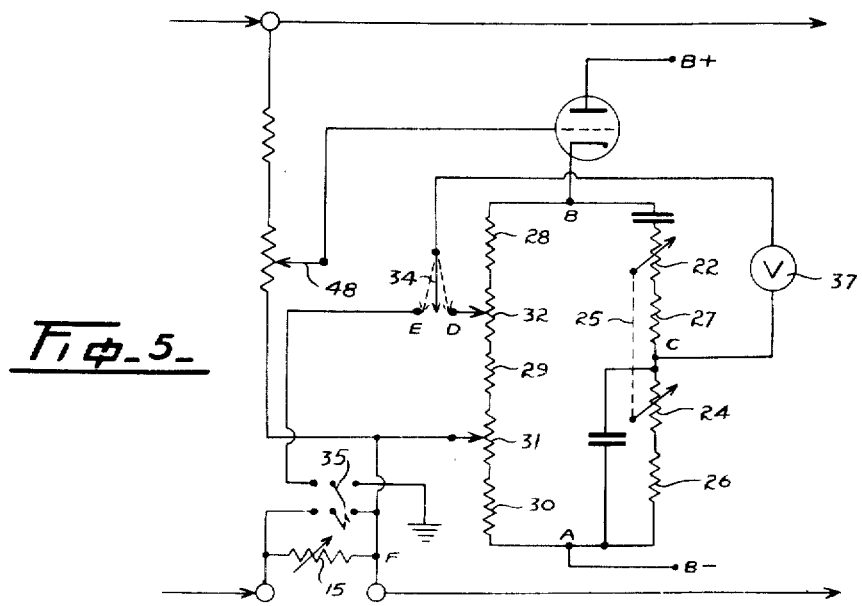
INVENTOR
GEORGE ALLAN ARMSTRONG
ATTORNEY Patented Dec. 11, 1951

2,577,992

UNITED STATES PATENT OFFICE 2,577,992

PHASE ANGLE AND POWER FACTOR METER

George Allan Armstrong, Vancouver,
British Columbia, Canada

Application October 2, 1950, Serial No. 187,881

9 Claims. (Cl. 172—245)

1

My invention relates to improvements in phase angle and power factor meters.

The primary object of the invention is to provide a bridge circuit by which the phase angle between voltage and current in A. C. power circuits may be accurately measured. A further object is to provide a bridge by which phase angle may be measured over a range of frequencies.

In direct-reading power factor meters the torque exerted on the moving element is small, especially as zero phase angle is approached, so that stray fields from nearby conductors are apt to produce serious errors. The delicate suspension of their moving parts necessitates careful handling of the instrument. Due to the inherent resistance in the coils of induction instruments there is a fixed error which may be difficult to determine. In such instruments the readings will vary with frequency so measurements cannot be taken over a range of frequencies. Where several instruments are used, calculations are required, and the sign of the phase angle is ambiguous unless the nature of the load is known.

In bridges as now commonly used, the unknown to be measured is connected as one leg of the bridge. In measuring the power factor of high voltage insulators the high voltage is not only a hazard by bulky insulation and extensive shielding is required.

The present invention contemplates the use of a bridge with which the unknown to be measured is external to the bridge per se, so that the power factor of a high voltage insulator or other equipment is taken at rated voltage with only about three volts across the bridge itself. The general principle is as follows: A voltage in phase with the line voltage is impressed across the input terminals of the bridge. Adjustment of the bridge causes the output voltage to vary in phase with respect to the input voltage. The phase of the output voltage is varied until it cancels the voltage developed across a small resistance in series with the line, which latter voltage is in phase with the line current. The phase angle between line voltage and line current is then indicated by the bridge setting.

Referring to the drawings:

Figure 1 is a simplified diagram of the bridge.

Figure 2 is a vector diagram of the voltages developed between different points of the bridge.

Figure 3 is an elevational view of the dial of the meter.

Figure 4 is a side elevation of the dial and its parts.

Figure 5 is a circuit diagram showing the necessary connections of the instrument.

2

In the drawings like characters of reference indicate corresponding parts in each figure.

The bridge, as shown in Figure 1, may be adapted for connection into any A. C. circuit in which measurements are to be taken. It is non-inductive to avoid pick-up from stray fields and has arms 1 and 2. The arm 1 includes condensers 3 and 4 of equal capacity and resistances 5 and 6 also of equal value. Condensers 3 and resistance 5 are in series, 4 and 6 being in parallel. The other arm of the bridge includes resistances 8, 9 and 10. Resistances 9 and 10 are equal and resistance 8 is twice the sum of 9 and 10, hence 9 and 10 will each be equal to one-sixth of the total resistance of the branch. Voltage is applied to the bridge through points A and B and the output is taken from points C and D between the resistances 5 and 6 and between the resistances 8 and 9 respectively. A further take off point E is provided between the resistances 9 and 10 to which is connected a variable resistance or rheostat 15 having a take off point F.

It can be shown mathematically that, with the resistances 8, 9 and 10 proportioned as above, with the resistances 5 and 6 each equal to R and with the reactance of condensers 3 and 4 equal to X, then the voltage between points C and E will be constant in amplitude regardless of the values of R and X but the phase of this output voltage will vary with variation of either R or X. This is illustrated by the vector diagram in Figure 2. The magnitude of the angle will be given by the formula $$\theta = 2 \tan^{-1} \frac{(X/R - R/X)}{3}$$

Clearly, this angle will be zero when the resistance R is made equal to the reactance X, and can be given any desired value by varying R accordingly.

The bridge, as preferably used in the phase angle or power factor instrument, is modified as shown in Figure 5, where the right arm of the bridge is provided with variable potentiometers 22 and 24 which are coupled together by a common control 25, whereby they are always equal to each other. Fixed resistances 26 and 27 are inserted to set the proper limits to the scale of the instrument. The left arm of the bridge is provided with resistances 28, 29 and 30 and potentiometers 31 and 32, which potentiometers are small in value compared with resistances 28, 29 and 30, and are inserted so that correct ratios in the resistance branch of the bridge may be obtained. A single-pole double-throw switch 34, is provided to switch the output connection from the frequency measuring position D, to the phase measuring position E through F. A double-pole double-throw switch 35 is provided for reversing the phase of the current vector voltage developed across rheostat 15.

The meter indicated in Figure 5 by the numeral 37, will preferably be a vacuum tube voltmeter arrangement, with a range of 0-1 volt or lower in order to obtain relatively large deflection without requiring a large voltage drop across the rheostat 15. The vacuum tube amplifier arrangement shown serves to isolate the bridge from the line and at the same time to obtain a voltage across said bridge in phase with the line voltage. The operation of the meter is by means of a control device 38, see Figures 3 and 4, in which the shaft 25 coupling the potentiometers 22 and 24 projects through a panel 40. Frictionally held upon said shaft is a phase angle scale 43 which index may be set to any desired position. A thumb nut 47 is provided to secure scale 43 against rotation after setting. Surrounding scale 43 and secured to the panel is a frequency scale 41. A knob 44 is attached to the shaft 25 to turn it and a transparent pointer 45 having an index line 46 is attached to the knob.

With the circuit as shown in Figure 5, the bridge is isolated from the line but obtains a voltage across it in phase with the line voltage, as for example: If the grid of tube is driven positive the potential at B+ will also go positive and the current will pass through the entire resistance branch to A which is connected to B negative. Thus A is driven negative through E to the return through potentiometer 31. In consequence of the above a voltage in phase with the line voltage is impressed across the bridge, the point E is returned to the line through switch 35 yet the point A is isolated from the line. This arrangement provides over 83% negative feedback, making the gain of the tube slightly greater than unity. Phase shift between line and bridge is practically nil and aging of the tube or changes in plate voltage will have negligible effect on the voltage amplification of the tube, thus preventing any variation in the calibration of the potentiometer 48, the purpose which is to adjust the voltage input to the bridge.

With the output taken from points C and E, rheostat 15 being set at zero resistance, the voltage output is constant for any setting of knob 44 and is proportional to the voltage input to the bridge as set by potentiometer 48. Hence for a given line voltage a certain setting of potentiometer 48 is required to produce a particular deflection on voltmeter 37. If the line voltage be low, a higher setting of potentiometer 48 is required to bring the bridge voltage up to its proper working value. The dial controlling potentiometer 48 may be calibrated in terms of the line voltage which for each particular setting of the dial would give the proper deflection on voltmeter 37. This adjustment will then automatically give a measure of the line voltage.

From the equation given in column 2, line 35, it is seen that the phase of the voltage output taken from points C and E depends on the reactance X of condensers 3 and 4, i. e., it varies with frequency. To adapt the bridge for use over a range of frequencies the phase angle scale 43 was made adjustable. To determine the proper setting of scale 43 for a particular frequency, the switch 34 is returned to D position and a frequency balance is obtained by adjustment of the control knob 44 and the potentiometer 32. When so balanced, the pointer line 46 indicates on the scale 41, the frequency of the voltage being tested. At frequency balance, R and X of the basic equation are equal. The scale 43 must therefore be rotated about the shaft 25 until zero degrees on the scale coincide with the index line 46. The scale in then locked in position.

For the purpose of phase measuring, the switch 34 is returned to close the circuit through switch 35 and the rheostat 15 to the potentiometer 31. A phase balance is secured by adjustment of the control knob 44 and of the rheostat 15. The phase angle will be indicated on scale 43.

Different values of line current will require different settings of the rheostat 15 in order to make the voltage developed across 15 equal in amplitude to the normal voltage developed between points C and E. The dial controlling rheostat 15 can thus be calibrated in amperes and when phase balance has been completed will indicate the current being drawn by the load.

The sliding scale arrangement has the following advantages: greater accuracy of measurement of the angle is possible inasmuch as the zero may be set directly over the point of frequency balance and phase angles may be measured at any frequency within the range of the instrument. The frequency range may be extended indefinitely by cutting in different sizes of condensers 3 and 4 as by a switch.

By virtue of the ability to vary the voltage to the bridge as by potentiometer 48 to maintain a certain voltage amplitude across the bridge and by inserting the resistance 15 in series with the load; the unknown impedance is kept external to the bridge and can be tested at full operating voltage and current conditions, the voltage across the load and current through the load are measured and the accuracy of the bridge balance is not affected by the impedance of the load. The work of four distinct meters is combined in a single instrument.

The instrument may be used in innumerable applications not herein described. These include measurement of distortion (wave analysis); as a tuneable filter circuit; as a synchroscope for adjusting the voltage speed and phase of an alternator, so that it may be safely connected in parallel with another alternator already in operation; for measuring the characteristics of electric circuits or gear and for location of faults in transmission lines. The principle may also be applied to echo-ranging equipment and to servo-mechanism controls.

What I claim as my invention is:

1. A bridge circuit having input and output terminals for measuring phase angle between line voltage and current, said circuit comprising a pair of arms through which voltage is to be applied to the bridge in phase with the line voltage, one of said arms including a condenser and a resistance in series, and a condenser and a resistance in parallel, the second of said arms including three resistances, two of said resistances being equal and a third resistance being of twice the sum of the said two resistances, said second arm having connected thereto between some of its resistances a further resistance which is adapted for connection in series with the line.

2. A bridge circuit having input and output terminals for measuring phase angle between voltage and current, said circuit comprising a pair of arms each connected in parallel between said terminals, one of said arms including a condenser and a resistance in series, and a condenser and a resistance in parallel, the second of said arms having three resistances in series, two adjacent resistances of said second arm having equal value and the remaining resistance of said second arm having a value of the sum of the two equal value resistances and a further resistance external to said second arm and connected therewith between the resistances of equal value, said further resistance being adapted for series connection in the line.

3. A bridge circuit for measuring phase angle between line voltage and current comprising a pair of arms having input and output terminals, one of said arms having a pair of variable potentiometers and a resistance on opposite sides of one output terminal, said potentiometers being operatively coupled for common control, said other arm being provided with three spaced resistances and a potentiometer between the first and second and between the second and third of said resistances and a rheostat connected from said arm externally of the bridge and adapted for connection with the line to be measured, said last named potentiometers being adapted for connection to the rheostat.

4. A bridge circuit for measuring phase angle between line voltage and current as claimed in claim 3, wherein a voltmeter is connected between one of the potentiometers of one arm and to the output terminal between the coupled potentiometers.

5. A bridge circuit for measuring phase angle between line voltage and current as claimed in claim 3, wherein an amplifier is provided to isolate the bridge from the line and to obtain a voltage across said bridge in phase with the line voltage.

6. In a bridge circuit as claimed in claim 3, said coupled potentiometers having a single control shaft, means for rocking the shaft, a voltmeter interposed between output terminals of the bridge to measure the voltage differential between said output terminals, an annular phase angle scale surrounding the shaft, said scale being adjustable about the shaft, means for locking the angle scale in any position, said shaft having a pointer to read upon the angle scale, and an annular frequency scale surrounding the phase angle scale.

7. Phase angle measuring equipment which consists of a bridge circuit having a potentiometer to maintain a given voltage amplitude across said bridge and a resistance inserted in series with the load on said line and connected with one arm of said bridge whereby the impedance of the load does not affect the balance of the bridge.

8. A bridge circuit for measuring phase angle between line voltage and current comprising a pair of arms having input and output terminals, one of said arms having a pair of variable potentiometers and a resistance on opposite sides of one output terminal, said potentiometers being operatively coupled for common control, said other arm being provided with three spaced resistances and a potentiometer between the first and second and between the second and third of said resistances and a rheostat connected from said arm externally of the bridge and adapted for connection with the line to be measured, said last named potentiometers being adapted for connection to the rheostat, an amplifier connecting one side of the line to the bridge and a potentiometer for adjusting the input to the amplifier.

9. A bridge circuit for measuring phase angle between line voltage and current comprising a pair of arms having input and output terminals, one of said arms having a pair of variable potentiometers and a resistance on opposite sides of one output terminal, said potentiometers being operatively coupled for common control, said other arm being provided with three spaced resistances and a potentiometer between the first and second and between the second and third of said resistances and a rheostat connected from said arm externally of the bridge and adapted for connection with the line to be measured, said last named potentiometers being adapted for connection to the rheostat and an amplifier isolating the bridge from the line and serving to obtain a voltage across said bridge in phase with the line voltage and a potentiometer providing for adjusting the input to the amplifier.

GEORGE ALLAN ARMSTRONG.

No references cited.

Certificate of Correction

Patent No. 2,577,992

December 11, 1951

GEORGE ALLAN ARMSTRONG

It is hereby certified that error appears in the above numbered patent requiring correction as follows:

In the drawing, Figure 5 should appear as shown below instead of as in the patent—

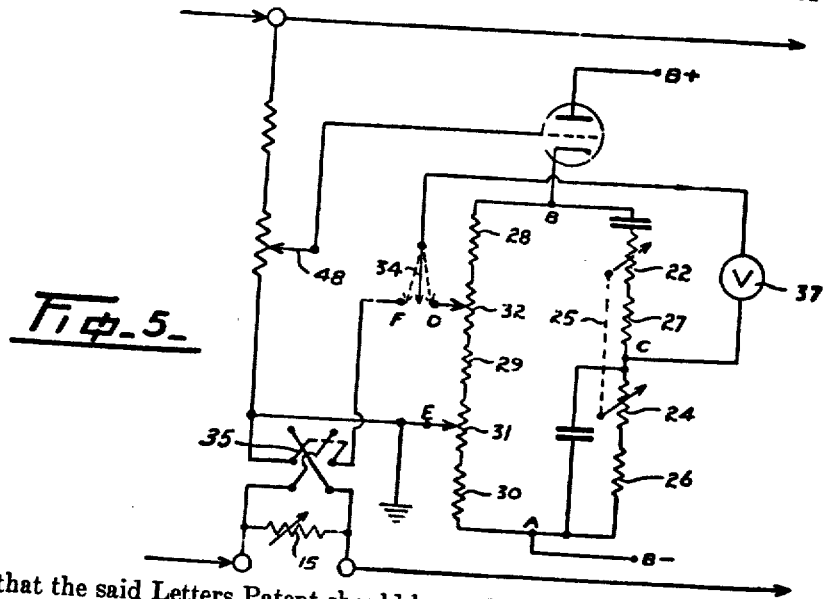

and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*